United States Patent
Lee et al.

(10) Patent No.: US 11,502,283 B2
(45) Date of Patent: Nov. 15, 2022

(54) NEGATIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Su-Min Lee, Daejeon (KR); Eun-Kyung Kim, Daejeon (KR); Je-Young Kim, Daejeon (KR); Yong-Ju Lee, Daejeon (KR); Rae-Hwan Jo, Daejeon (KR)

(73) Assignee: LG Energy Solution, Ltd.

( * ) Notice: Subject to any disclaimer, the term of this patent is extended or adjusted under 35 U.S.C. 154(b) by 249 days.

(21) Appl. No.: 16/760,332

(22) PCT Filed: Nov. 23, 2018

(86) PCT No.: PCT/KR2018/014566
§ 371 (c)(1),
(2) Date: Apr. 29, 2020

(87) PCT Pub. No.: WO2019/103546
PCT Pub. Date: May 31, 2019

(65) Prior Publication Data
US 2020/0343527 A1    Oct. 29, 2020

(30) Foreign Application Priority Data
Nov. 24, 2017    (KR) ........................ 10-2017-0158584

(51) Int. Cl.
*H01M 4/04*        (2006.01)
*H01M 4/13*        (2010.01)
(Continued)

(52) U.S. Cl.
CPC ........... *H01M 4/0404* (2013.01); *H01M 4/13* (2013.01); *H01M 4/139* (2013.01); *H01M 4/366* (2013.01);
(Continued)

(58) Field of Classification Search
None
See application file for complete search history.

(56) References Cited

U.S. PATENT DOCUMENTS

| 2011/0229777 A1 | 9/2011 | Mak et al. |
| 2013/0183590 A1 | 7/2013 | Bae et al. |
| (Continued) | | |

FOREIGN PATENT DOCUMENTS

| CN | 102210042 A | 10/2011 |
| CN | 103250284 A | 8/2013 |
| (Continued) | | |

OTHER PUBLICATIONS

Search report from International Application No. PCT/KR2018/014566, dated Apr. 19, 2019.
(Continued)

*Primary Examiner* — Alix E Eggerding
(74) *Attorney, Agent, or Firm* — Lerner, David, Littenberg, Krumholz & Mentlik, LLP

(57) ABSTRACT

Disclosed is a negative electrode for a lithium secondary battery which includes: a negative electrode current collector; a first negative electrode mixture layer positioned on at least one surface of the negative electrode current collector and including a first negative electrode active material, a polymer binder and a conductive material; and a second negative electrode mixture layer positioned on the top surface of the first negative electrode mixture layer and including a second negative electrode active material, a polymer binder and a conductive material, wherein the second negative electrode active material has a smaller water contact angle as compared to the first negative electrode active material, and at least one of the first negative electrode active material and the second negative electrode active material is surface-modified.

10 Claims, 3 Drawing Sheets

(51) Int. Cl.
  *H01M 4/139*   (2010.01)
  *H01M 4/36*    (2006.01)
  *H01M 4/62*    (2006.01)
  *H01M 10/0525* (2010.01)
  *H01M 4/02*    (2006.01)

(52) U.S. Cl.
  CPC ....... *H01M 4/622* (2013.01); *H01M 10/0525* (2013.01); *H01M 2004/021* (2013.01); *H01M 2004/027* (2013.01)

(56) References Cited

U.S. PATENT DOCUMENTS

2013/0260237 A1    10/2013  Chang et al.
2019/0237756 A1*   8/2019   Wu ..................... H01M 4/587

FOREIGN PATENT DOCUMENTS

| | | |
|---|---|---|
| JP | H10092432 A | 4/1998 |
| JP | 2005243447 A | 9/2005 |
| JP | 2006196247 A | 7/2006 |
| JP | 2013182712 A | 9/2013 |
| JP | 2017168283 A | 9/2017 |
| KR | 20120069314 A | 6/2012 |
| KR | 20120093487 A * | 8/2012 |
| KR | 20120093487 A | 8/2012 |
| KR | 20130084457 A | 7/2013 |
| KR | 20170031201 A | 3/2017 |
| WO | 2015140984 A1 | 9/2015 |
| WO | 2016008951 A1 | 1/2016 |

OTHER PUBLICATIONS

Extended European Search Report for EP Application 18881945.2 dated Nov. 2, 2020.
Search Report dated Apr. 22, 2022 from Office Action for Chinese Application No. 201880039123.2 issued Apr. 26, 2022. 3 pgs. (see p. 2, categorizing the cited references).

* cited by examiner (a)

(b)

NEGATIVE ELECTRODE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/014566, filed Nov. 23, 2018, which claims priority to Korean Patent Application No. 10-2017-0158584 filed on Nov. 24, 2017, the disclosures of which are incorporated herein by reference.

TECHNICAL FIELD

The present disclosure relates to a negative electrode for a lithium secondary battery and a lithium secondary battery including the same.

BACKGROUND ART

As technological development and a demand for mobile instruments have been increased, rechargeable secondary batteries have been increasingly in demand as energy sources. In addition, among such secondary batteries, lithium secondary batteries having high energy density and voltage, long cycle life and a low discharge rate have been commercialized and used widely. A lithium secondary battery includes a positive electrode, a negative electrode and a separator interposed between the positive electrode and the negative electrode. The electrodes, such as the positive electrode and the negative electrode, are obtained by coating an electrode current collector with electrode slurry containing an electrode active material, binder and a solvent, followed by drying and pressing.

Recently, active studies have been conducted about the manufacture of a multi-layer electrode using two or more types of active materials in order to improve the performance of a battery, such as electrode adhesion, charging speed, or the like. When manufacturing a multi-layer electrode, it is possible to improve the problems of degradation of electrode adhesion and speed charging that may occur in the case of a monolayer electrode, and to improve life characteristics.

However, there are many problems, including a need for a complicated process, such as a coating system, and degradation of interfacial adhesion in a multi-layer electrode, in manufacturing a multi-layer electrode.

Disclosure

Technical Problem

The present disclosure is designed to solve the problems of the related art, and therefore the present disclosure is directed to providing a negative electrode for a lithium secondary battery which can be provided in the form of a multi-layer electrode through a simple process and improve the performance of a battery with low cost, and a lithium secondary battery including the same.

Technical Solution

In one aspect of the present disclosure, there is provided a negative electrode for a lithium secondary battery which includes: a negative electrode current collector; a first negative electrode mixture layer positioned on at least one surface of the negative electrode current collector and including a first negative electrode active material, a polymer binder and a conductive material; and a second negative electrode mixture layer positioned on the top surface of the first negative electrode mixture layer and including a second negative electrode active material, a polymer binder and a conductive material, wherein the second negative electrode active material has a smaller water contact angle as compared to the first negative electrode active material, and at least one of the first negative electrode active material and the second negative electrode active material is surface-modified.

The second negative electrode active material may be surface-modified through hydrophilization, or the first negative electrode active material may be surface-modified through hydrophobization; or the second negative electrode active material may be surface-modified through hydrophilization and the first negative electrode active material may be surface-modified through hydrophobization at the same time.

The ratio of the water contact angle of the first negative electrode active material to the water contact angle of the second negative electrode active material may be 1.5-18.

The ratio of the water contact angle of the first negative electrode active material to the water contact angle of the second negative electrode active material may be 7-18.

The water contact angle of the first negative electrode active may be 95°-150° and the water contact angle of the second negative electrode active material may be 5°-60°.

The water contact angle of the first negative electrode active may be 95°-150° and the water contact angle of the second negative electrode active material may be 70°-90°.

The water contact angle of the first negative electrode active may be 70°-90° and the water contact angle of the second negative electrode active material may be 5°-60°.

The negative electrode may further include: a third negative electrode mixture layer positioned on the top surface of the second negative electrode mixture layer and including a third negative electrode active material, a polymer binder and a conductive material, wherein the third negative electrode active material may have a smaller water contact angle as compared to the first negative elective active material and the second negative electrode active material.

In another aspect of the present disclosure, there is provided a method for manufacturing a negative electrode for a lithium secondary battery, including the steps of:

preparing slurry for a negative electrode mixture layer including a first negative electrode active material, a second negative electrode active material, a polymer binder, a conductive material and a dispersion medium, wherein the second negative electrode active material has a smaller water contact angle as compared to the first negative electrode active material, and at least one of the first negative electrode active material and the second negative electrode active material is surface-modified;

allowing the second negative electrode active material in the slurry for a negative electrode mixture layer to move toward the upper surface of the slurry as compared to the first negative electrode active material, thereby causing interlayer separation between the second negative electrode active material and the first negative electrode active material; and applying the interlayer separated slurry for a negative electrode mixture layer to at least one surface of a negative electrode current collector, followed by drying, to form a first negative electrode mixture layer including the first negative electrode active material, polymer binder and the conductive material; and a second negative electrode mixture layer positioned on the top surface of the first negative electrode mixture layer and including the second negative electrode active material, polymer binder and the conductive material.

When a third negative electrode active material having a smaller water contact angle as compared to the first negative electrode active material and the second negative electrode active material is further incorporated to the slurry for a negative electrode mixture layer in the step of preparing slurry for a negative electrode mixture layer, the third negative electrode active material in the slurry for a negative electrode mixture layer moves toward the upper surface of the slurry as compared to the second negative electrode active material and the first negative electrode active material to cause interlayer separation of the third negative electrode active material, the second negative electrode active material and the first negative electrode active material, successively, and the interlayer separated slurry for a negative electrode mixture layer may be applied to at least one surface of a negative electrode current collector, followed by drying, to form a first negative electrode mixture layer including the first negative electrode active material, polymer binder and the conductive material; a second negative electrode mixture layer positioned on the top surface of the first negative electrode mixture layer and including the second negative electrode active material, polymer binder and the conductive material, and a third negative electrode mixture layer positioned on the top surface of the second negative electrode mixture layer and including the third negative electrode active material, polymer binder and the conductive material.

In still another aspect of the present disclosure, there is provided a lithium secondary battery including a positive electrode, a negative electrode and a separator interposed between the positive electrode and the negative electrode, wherein the negative electrode is the above-defined negative electrode.

Advantageous Effects

According to an embodiment of the present disclosure, it is possible to avoid a need for preparing individual negative electrode slurry for forming a multi-layered negative electrode. There is no need for steps of applying and drying negative electrode slurry many times, since a negative electrode including a multi-layered negative electrode active material layer can be obtained through a single application and drying step using single negative electrode slurry.

In other words, when two or more types of negative electrode active materials having different water contact angles are used in negative electrode slurry, interlayer separation occurs from the upper side to the lower side of the slurry in order of smallest water contact angle to largest water contact angle, and thus a multi-layered negative electrode can be formed according to self-assemblage with no need for an additional process. As a result, it is possible to improve the performance of a battery, including output and life, as compared to a mono-layered negative electrode. In addition, it is possible to improve the cost-efficiency, electrode adhesion and life characteristics of a battery, as compared to the conventional multi-layered negative electrode obtained by multiple application steps using a plurality of negative electrode slurry.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The present disclosure is directed to providing a negative electrode having a multilayer structure derived from self-assemblage, with no need for an additional process, by using two or more types of negative electrode active materials having different surface properties in negative electrode slurry in order to solve the problem of a complicated process including preparing individual negative electrode slurry for forming a multi-layered negative electrode and applying and drying negative electrode slurry many times according to the related art.

In general, a solid surface, such as metal or polymer, has its unique surface energy, and such surface energy can be evaluated by measuring the contact angle.

Figure 1:
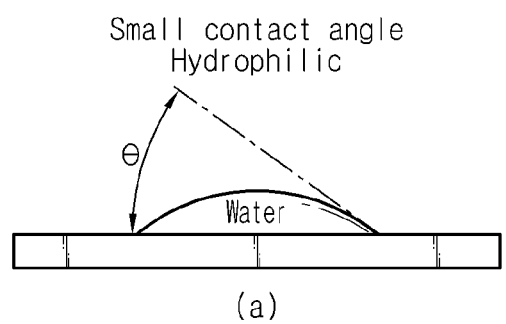
FIG. 1 is a schematic view illustrating hydrophilicity and hydrophobicity depending on water contact angle.
Figure 1:
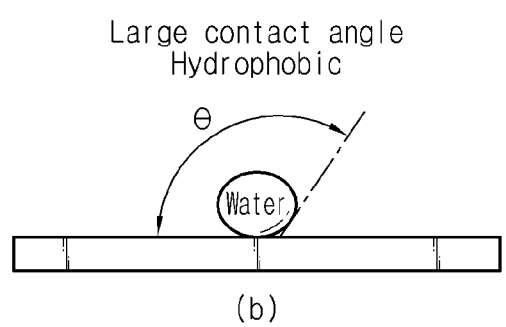

The angle to the solid surface formed when a straight line is drawn on the water drop surface at a spot where the water drop in a steady state is in contact with the solid is defined as water contact angle. Referring to FIG. 1, when the water contact angle (θ) is small, a sphere-shaped water drop loses its shape more easily on the solid surface and wets the solid surface. In this case, the solid surface is regarded as hydrophilic. On the contrary, when the water contact angle is large, the water drop maintains its spherical shape and cannot wet the solid surface. In this case, the solid surface is regarded as hydrophobic.

As used herein, 'water contact angle' means the angle formed between the interface of water and the interface of a negative electrode active material on the surface of the negative electrode active material. A negative electrode active material having a small water contact angle means that the surface of the negative electrode active material has high wettability (hydrophilicity) and high surface energy, while a negative electrode active material having a large water contact angle means that the surface of the negative electrode active material has low wettability (hydrophobicity) and low surface energy.

Therefore, according to the present disclosure, among the surface properties of a negative electrode active material, the water contact angle is differently (Memo: to be consistent with PCT publication) controlled to solve the above-mentioned technical problem.

In one aspect of the present disclosure, there is provided a negative electrode for a lithium secondary battery which includes: a negative electrode current collector; a first negative electrode mixture layer positioned on at least one surface of the negative electrode current collector and including a first negative electrode active material, a polymer binder and a conductive material; and a second negative electrode mixture layer positioned on the top surface of the first negative electrode mixture layer and including a second negative electrode active material, a polymer binder and a conductive material, wherein the second negative electrode active material has a smaller water contact angle as compared to the first negative electrode active material, and at least one of the first negative electrode active material and the second negative electrode active material is surface-modified.

In order to provide the second negative electrode active material with a smaller water contact angle as compared to the first negative electrode active material, the second negative electrode active material may be surface-modified to have a smaller water contact angle, or the first negative electrode active material may be surface-modified to have a larger water contact angle.

The surface modification method may be any surface modification method, as long as it changes the water contact angle of at least one of the first negative electrode material and the second negative electrode active material.

Particular examples of the surface modification method capable of changing the water contact angle of a negative electrode active material include surface modification for reducing the water contact angle through hydrophilization or surface modification for increasing the water contact angle through hydrophobization.

According to an embodiment of the present disclosure, the second negative electrode active material may be surface-modified through hydrophilization or the first negative electrode active material may be surface-modified through hydrophobization; or the second negative electrode active material may be surface-modified through hydrophilization and the first negative electrode active material may be surface-modified through hydrophobization at the same time. The ratio of the water contact angle of the first negative electrode active material to that of the second negative electrode active material may be 1.5-18, 2-16, 2-14, 7-18, or 7-14. Herein, the ratio of the water contact angle of the first negative electrode active material to that of the second negative electrode active material corresponds to the value of 'a/b', when the water contact angle of the first negative electrode active material is taken as 'a' and that of the second negative electrode active material is taken as 'b'. When the ratio of water contact angles satisfies the above-defined range, the first negative electrode active material and the second negative electrode active material may be added to a dispersion medium together with a conductive material, a binder polymer and a thickening agent, and then the resultant slurry is agitated. Then, the first negative electrode active material is not mixed with the second negative electrode active material but is separated clearly. After a current collector is coated with the slurry, the first negative electrode active material and the second negative electrode active material may form a bilayer structure. To increase the ratio of water contact angles to 18 or more, it is required to further increase the water contact angle of the first negative electrode active material or to further reduce the water contact angle of the second negative electrode active material. However, even when each negative electrode active material is surface treated, it is not practically easy to increase or decrease the water contact angle to a higher or lower level than a certain value.

A currently used negative electrode active material may have a water contact angle of 70°-90°. For example, natural graphite has a water contact angle of 70°.

According to an embodiment of the present disclosure, when the second negative electrode active material is surface-modified through hydrophilization, the water contact angle of the second negative electrode active material may be decreased to 5°-60°, 8°-40°, 8°-12°, 10°-40°, or 20°-30°, and the water contact angle of the first negative electrode active material may be 70°-100°.

In addition, when the first negative electrode active material is surface-modified through hydrophobization, the water contact angle of the first negative electrode active material may be increased to 95°-150°, 100°-150°, 110°-144°, or 140°-144°, and the water contact angle of the second negative electrode active material may be 70°-100°.

According to an embodiment of the present disclosure, the first negative electrode active material may be treated through hydrophobization and the second negative electrode active material may be treated through hydrophilization so that two types of negative electrode active materials may be prepared, wherein the first negative electrode active material has a water contact angle of 95°-150° and the second negative electrode active material has a water contact angle of 5°-60°.

In a variant, only the first negative electrode active material is treated through hydrophobization and the second negative electrode active material is not surface-modified, or only the second negative electrode active material is treated through hydrophilization and the first negative electrode active material is not surface-modified.

In the former case, the water contact angle of the first negative electrode active material may be 95°-150° and that of the second negative electrode active material may be 70°-90°. In the latter case, the water contact angle of the first negative electrode active material may be 70°-90° and that of the second negative electrode active material may be 5°-60°.

According to an embodiment of the present disclosure, two or more types of negative electrode active materials having different water contact angles may be used, or three or more types of negative electrode active materials may be used.

For example, when three or more negative electrode active materials having different water contact angles are used, it is possible to provide a negative electrode for a lithium secondary battery which includes: a negative electrode current collector; a first negative electrode mixture layer positioned on at least one surface of the negative electrode current collector and including a first negative electrode active material, a polymer binder and a conductive material; a second negative electrode mixture layer positioned on the top surface of the first negative electrode mixture layer and including a second negative electrode active material, a polymer binder and a conductive material; and a third negative electrode mixture layer positioned on the top surface of the second negative electrode mixture layer and including a third negative electrode active material, a polymer binder and a conductive material, wherein at least one of the first negative electrode active material, the second negative electrode active material and the third negative electrode active material is surface-modified so that the water contact angle is increased in order of the third negative electrode active material, the second negative electrode active material and the first negative electrode active material from smallest to largest.

According to an embodiment of the present disclosure, particular examples of the method for surface modification of the negative electrode active material for the purpose of changing the water contact angle, specifically, those of the method for reducing the water contact angle to increase the surface energy, include high voltage corona discharge, direct current plasma discharge, or the like.

High voltage corona discharge refers to a method including filling a vacuum tank with reactive gas to approximately ambient pressure, ionizing the reactive gas by the electrons released from an electrode, forming negatively and positively charged plasma in the electromagnetic same extent as the electrons, and allowing the formed ions to react on the surface of a negative electrode active material to carry out surface deposition or surface modification.

In addition, particular examples of the method for increasing the water contact angle to reduce the surface energy include a coating method with a hydrophobic material or a method for forming surface nanostructures. For example, the coating method with a hydrophobic material may be carried out by coating the surface of a negative electrode material with a hydrophobic material, such as alkyltrichlorosilane, alkyltrimethoxysilane, alkultriethoxysilane, polytetrafluoroethylene (PTFE), perfluoroalkoxyalkane (PFA), dichlorodimethylsilane (DDMS), perflurodecyltrichlorosilane (FDTS), fluorooctyltrichlorosilane (FOTS) and octadecyltrimethoxysilane (OTMS), under vacuum at a temperature of 80-150° C. through vapor phase deposition or the like. In addition, the method for forming surface nanostructures may be carried out by attaching nanoparticles to the surface of a negative electrode active material physically/chemically to form nanostructures.

Particular examples of the negative electrode active material include carbonaceous material, lithium metal, silicon or tin capable of lithium ion intercalation/deintercalation. Metal oxides, such as $TiO_2$ and $SnO_2$, having a potential less than 2 V versus lithium may also be used. Preferably, carbonaceous materials may be used. As a carbonaceous material, both low crystalline carbon and highly crystalline carbon may be used. Typical examples of the low crystalline carbon include soft carbon and hard carbon and those of highly crystalline carbon include natural graphite, Kish graphite, graphite, pyrolytic carbon, mesophase pitch based carbon fibers, meso-carbon microbeads, mesophase pitches and high-temperature baked carbon, such as petroleum or coal tar pitch derived cokes.

In addition, the negative electrode active material may have an average particle diameter ($D_{50}$) of 1-30 μm, particularly 5-25 μm. When the average particle diameter of the negative electrode active material satisfies the above-defined range, it is possible to disperse the negative electrode active material in slurry with ease and to solve the problem of degradation of bindability among particles during repeated charge/discharge cycles caused by severe swelling of particles due to lithium ion intercalation.

According to the present disclosure, 'average particle diameter' refers to particle diameter corresponding to 50% of particle diameter distribution. For example, the average diameter ($D_{50}$) of particles according to an embodiment of the present disclosure may be determined by using a laser diffraction method. In general, the laser diffraction method can determine a particle diameter ranging from the submicron region to several mm and provide results with high reproducibility and high resolution.

The polymer binder is an ingredient which assists the binding between a negative electrode active material and a conductive material and the binding to a current collector. Particular examples of the polymer binder include various polymers, such as polyvinylidene fluoride-co-hexafluoropropylene, polyvinylidene fluoride, polyacrylonitrile, polymethyl methacrylate, styrene-butadiene rubber, carboxymethyl cellulose, or the like. The polymer binder may be used in an amount of 1-10 parts by weight, particularly 1.2-8.7 parts by weight, and more particularly 1.5-8 parts by weight, based on 100 parts by weight of the negative electrode active material contained in each mixture layer.

The conductive material is not particularly limited, as long as it has conductivity while not causing any chemical change in a lithium secondary battery. Particular examples of the conductive material include graphite, such as natural graphite or artificial graphite; carbon black, such as carbon black, acetylene black, ketjen black, channel black, furnace black, lamp black or thermal black; conductive fibers, such as carbon fibers or metallic fibers; metal powder, such as aluminum or nickel powder; conductive whisker, such as zinc oxide or potassium titanate; a conductive metal oxide such as titanium dioxide; a conductive polymer such as a polyphenylene derivative; or the like.

The conductive material may be used in an amount of 0.1-20 parts by weight, particularly 0.5-15 parts by weight, and more particularly 1-10 parts by weight, based on 100 parts by weight of the negative electrode active material in the negative electrode mixture layer.

In another aspect of the present disclosure, there is provided a method for manufacturing a negative electrode for a lithium secondary battery, including the steps of:

preparing slurry for a negative electrode mixture layer including a first negative electrode active material, a second negative electrode active material, a polymer binder, a conductive material and a dispersion medium, wherein the second negative electrode active material has a larger surface energy as compared to the first negative electrode active material, and at least one of the first negative electrode active material and the second negative electrode active material is surface-modified;

allowing the second negative electrode active material in the slurry for a negative electrode mixture layer to move toward the upper surface of the slurry as compared to the first negative electrode active material, thereby causing interlayer separation between the second negative electrode active material and the first negative electrode active material; and applying the interlayer separated slurry for a negative electrode mixture layer to at least one surface of a negative electrode current collector, followed by drying, to form a first negative electrode mixture layer including the first negative electrode active material, polymer binder and the conductive material; and a second negative electrode mixture layer positioned on the top surface of the first negative electrode mixture layer and including the second negative electrode active material, polymer binder and the conductive material.

Figure 2:
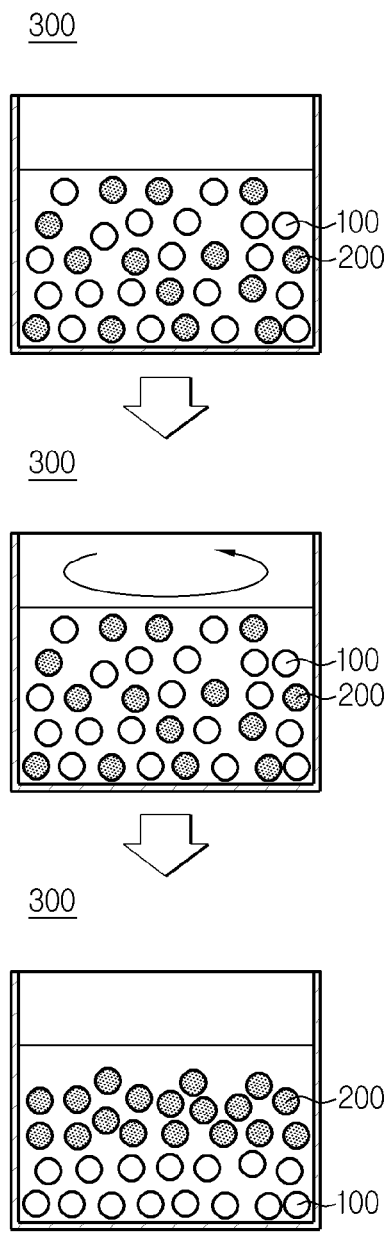
FIG. 2 is a schematic view illustrating the method for manufacturing a negative electrode for a lithium secondary battery according to an embodiment of the present disclosure.

Referring to FIG. 2, at least one of the first negative electrode active material 100 and the second negative electrode active material 200 is surface-modified first so that the second negative electrode active material 200 may have a smaller water contact angle and a larger surface energy as compared to the first negative electrode active material 100, and then slurry for a negative electrode mixture layer is prepared by using the obtained first and second negative electrode active materials 100, 200, a polymer binder, a conductive material and a dispersion medium. The method for preparing slurry for a negative electrode mixture layer may be any one of the conventional methods for preparing slurry. For example, the conductive material is dispersed in the dispersion medium, adding the active materials and polymer binder thereto, and carrying out agitation and dispersion. In addition, if desired, a thickening agent, such as carboxymethyl cellulose (CMC), carboxyethyl cellulose or polyvinyl pyrrolidone, may be further incorporated to the slurry.

While the prepared slurry for a negative electrode mixture layer is agitated through a conventional agitation process, the second negative electrode active material 200 having a relatively smaller water contact angle, higher wettability and larger surface energy undergoes self-assemblage by moving toward the surface portion of the slurry, and thus interlayer separation occurs between the second negative electrode active material 200 and the first negative electrode active material 100 from the upper surface to the lower surface.

Figure 3:
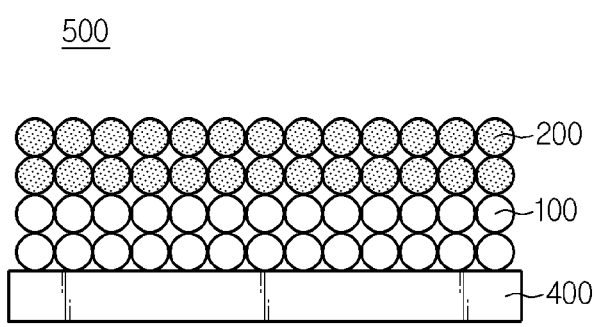
FIG. 3 is a schematic view illustrating the negative electrode for a lithium secondary battery according to an embodiment of the present disclosure.

Referring to FIG. 3, the separated slurry for a negative electrode mixture layer is applied to at least one surface of a negative electrode current collector 400, followed by drying, to obtain a negative electrode 500 having a bilayer structure including: a first negative electrode mixture layer including the first negative electrode active material 100, polymer binder and the conductive material; and a second negative electrode mixture layer positioned on the top surface of the first negative electrode mixture layer and including the second negative electrode active material 200, polymer binder and the conductive material.

The negative electrode current collector generally has a thickness of 3-500 μm. The negative electrode current collector is not particularly limited, as long as it has conductivity while not causing any chemical change in the corresponding battery. Particular examples of the negative electrode current collector include copper, stainless steel, aluminum, nickel, titanium, baked carbon, or copper or stainless steel surface-treated with carbon, nickel, titanium, silver, etc., aluminum-cadmium alloy, or the like. In addition, similarly to the positive electrode current collector, the negative electrode current collector may have fine surface irregularities formed on the surface thereof to increase the adhesion of a negative electrode active material, and may have various shapes, such as a film, sheet, foil, net, porous body, foam or non-woven web body.

In addition, the negative electrode mixture layer according to an embodiment of the present disclosure may have a total thickness of 50-300 μm, particularly 80-120 μm. Particularly, the first negative electrode mixture layer may have a thickness of 10-145 μm, particularly 30-60 μm, and the second negative electrode mixture layer may have a thickness of 10-30 μm, particularly 20-25 μm. When the negative electrode mixture layer further includes a third negative electrode mixture layer, the third negative electrode mixture layer may have a thickness of 10-145 μm, particularly 30-60 μm.

The slurry for a negative electrode mixture layer may further include a filler. Such a filler is an ingredient capable of inhibiting swelling of a negative electrode and may be used optionally. There is no particular limitation in the filler, as long as it is a fibrous material while not causing any chemical change in the corresponding battery. Particular examples of the filler include olefinic polymers, such as polyethylene and polypropylene; fibrous materials, such as glass fibers and carbon fibers; or the like.

The dispersion medium may include water.

The application may be carried out by any method known to those skilled in the art. For example, after the negative electrode active material is distributed on the top surface of the negative electrode current collector, it may be dispersed homogeneously by using a doctor blade, or the like. In addition, the application may be carried out through a die casting, comma coating, screen printing process, or the like.

Although there is no particular limitation in the drying, drying may be carried out in a vacuum oven at 50-200° C. within 1 day.

As described above, according to an embodiment of the present disclosure, two or three types of negative electrode active materials having different water contact angles may be used.

For example, when three types of negative electrode active materials having different water contact angles are used, the third negative electrode active material having a smaller water contact angle as compared to the first and the second negative electrode active materials may be further incorporated in the step of preparing the slurry for a negative electrode mixture layer.

In this case, the third negative electrode active material in the slurry for a negative electrode mixture layer moves toward the upper surface as compared to the first and the second negative electrode active materials to cause interlayer separation of the third negative electrode active material, the second negative electrode active material and the first negative electrode active material from the upper side to the lower side of the slurry. The separated slurry for a negative electrode mixture layer is applied to at least one surface of the negative electrode current collector and then dried to form the first negative electrode mixture layer including the first negative electrode active material, polymer binder and the conductive material; the second negative electrode mixture layer positioned on the top surface of the first negative electrode mixture layer and including the second negative electrode active material, polymer binder and the conductive material; and the third negative electrode mixture layer positioned on the top surface of the second negative electrode mixture layer and including the third negative electrode active material, polymer binder and the conductive material.

In still another aspect of the present disclosure, there is provided a lithium secondary battery including the above-described negative electrode and positive electrode for a secondary battery, and a separator interposed between the negative electrode and the positive electrode.

The positive electrode includes a positive electrode current collector and a positive electrode mixture layer formed on at least one surface of the positive electrode current collector. The positive electrode mixture layer may include a positive electrode active material, a conductive material and a polymer binder.

The positive electrode active material may include a lithium-containing oxide, and a lithium-containing transition metal oxide may be used preferably. Particular examples of the lithium-containing transition metal oxide include any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0<y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), $Li_xFePO_4$ (0.5<x<1.3) and combinations thereof. The lithium-containing transition metal oxide may be coated with a metal, such as aluminum (Al) or metal oxide. Besides the lithium-containing transition metal oxide, sulfide, selenide and halide may also be used.

The positive electrode current collector is not particularly limited, as long as it has high conductivity while not causing any chemical change in the corresponding battery. Particular examples of the positive electrode current collector include stainless steel, aluminum, nickel, titanium, baked carbon, or aluminum or stainless steel surface-treated with carbon, nickel, titanium, silver, or the like. The positive electrode current collector may have fine surface irregularities formed on the surface thereof to increase the adhesion of a positive electrode active material, and may have various shapes, such as a film, sheet, foil, net, porous body, foam or non-woven web body.

The separator may be a porous polymer substrate, and the pore size and porosity of the porous polymer substrate are not particularly limited but may be about 0.01-50 μm and about 10-95%, respectively.

In addition, the porous polymer substrate may include a porous coating layer containing inorganic particles and a polymer binder on at least one surface of the porous substrate in order to improve the mechanical strength and to inhibit a short-circuit between the positive electrode and the negative electrode.

Non-limiting examples of the porous polymer substrate include at least one selected from the group consisting of polyethylene, polypropylene, polyethylene terephthalate, polybutylene terephthalate, polyester, polyacetal, polyamide, polycarbonate, polyimide, polyetherether ketone, polyarylether ketone, polyetherimide, polyamideimide, polybenzimidazole, polyether sulfone, polyphenylene oxide, cyclic olefin copolymer, polyphenylene sulfide, polyethylene naphthalene and combinations thereof.

In addition, the secondary battery further includes an electrolyte. The electrolyte may include a currently used organic solvent and lithium salt, but is not limited thereto.

Particular examples of the anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxy ethane, diethoxy ethane, vinylene carbonate, sulforane, γ-butyrolactone, propylene sulfite and tetrahydrofuran.

Particularly, ethylene carbonate and propylene carbonate, which are cyclic carbonates among the carbonate organic solvents, have a high viscosity and a high dielectric constant and dissociate the lithium salt in an electrolyte well. In addition, it is possible to prepare an electrolyte having high electroconductivity more preferably, when using such cyclic carbonates in combination with low-viscosity low-dielectric constant linear carbonates, such as dimethyl carbonate and diethyl carbonate, at an adequate ratio.

In addition, the electrolyte may further include pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics. In addition, the electrolyte may further include fluoro-ethylene carbonate (FEC), propene sultone (PRS), fluoro-propylene carbonate (FPC), or the like.

The lithium secondary battery according to an embodiment of the present disclosure may be obtained by interposing the separator between the positive electrode and the negative electrode to form an electrode assembly, introducing the electrode assembly to a cylindrical battery casing or prismatic battery casing, and then injecting the electrolyte thereto. Otherwise, the lithium secondary battery may be obtained by stacking the electrode assemblies, impregnating the stack with the electrolyte, and introducing the resultant product to a battery casing, followed by sealing.

The battery casing used herein may be one used conventionally in the art. There is not particular limitation in appearance of the battery depending on use. For example, the battery may be a cylindrical, prismatic, pouch type or coin type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size batteries include electric vehicles, hybrid electric vehicles, plug-in hybrid electric vehicles, power storage systems, or the like, but are not limited thereto.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Natural graphite having an average particle diameter ($D_{50}$) of 11 μm was subjected to vapor phase deposition with perfluorodecyl trichlorosilane (FDTS) under vacuum at 100° C. for 10 minutes to prepare a first negative electrode active material having a water contact angle of 140°.

Natural graphite having an average particle diameter ($D_{50}$) of 16 μm was subjected to plasma treatment under the following conditions to prepare a second negative electrode active material having a water contact angle of 10°.

The plasma treatment was carried out by using an inductively coupled plasma system forming high-density plasma under high vacuum. The input gas included $O_2$ and Ar gas and set to a flow rate of 40 sccm. The other processing conditions were as follows: source power of 50 W, pressure of 6 mTorr and treatment time of 1 minute.

The first negative electrode active material and the second negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a negative electrode mixture layer. Herein, the first negative electrode active material and the second negative electrode active material were used at a weight ratio of 1:1. The slurry for a negative electrode mixture layer was agitated at 70 rpm for 30 minutes. As a result, the second negative electrode active material was separated as the upper layer of slurry and the first negative electrode active material was separated as the lower layer of slurry. Then, the interlayer separated slurry for a negative electrode mixture layer was applied onto a copper current collector and dried in a vacuum oven at 130° C., and then pressing was carried out to obtain a negative electrode having a bilayer structure.

In addition, Li metal was used as a counter electrode and a porous polyethylene separator was interposed between the negative electrode and Li metal to form an electrode assembly, and an electrolyte containing 0.5 wt % of vinylene carbonate and 1M $LiPF_6$ dissolved in a mixed solvent of ethyl methyl carbonate (EMC) with ethylene carbonate (EC) at a volume ratio of 7:3 was injected thereto, thereby providing a lithium coin half-cell.

Example 2

A negative electrode having a bilayer structure and a lithium coin half-cell were obtained in the same manner as Example 1, except that non-surface treated natural graphite (water contact angle 70°) having an average particle diameter ($D_{50}$) of 11 μm was used as the first negative electrode active material, and plasma-treated natural graphite having an average particle diameter ($D_{50}$) of 16 μm and a water contact angel of 10° was used as the second negative electrode active material.

Example 3

A negative electrode having a bilayer structure and a lithium coin half-cell were obtained in the same manner as Example 1, except that natural graphite having an average particle diameter ($D_{50}$) of 11 μm and subjected to vapor phase deposition with perfluorodecyl trichlorosilane (FDTS) at 100° C. for 10 minutes so that it might have a water contact angle of 140° was used as the first negative electrode active material, and non-surface treated natural graphite having an average particle diameter ($D_{50}$) of 15 μm and a water contact angel of 70° was used as the second negative electrode active material.

Example 4

Natural graphite having an average particle diameter ($D_{50}$) of 11 μm was subjected to vapor phase deposition with perfluorodecyl trichlorosilane (FDTS) under vacuum at 100° C. for 30 minutes to prepare a first negative electrode active material having a water contact angle of 144°.

Natural graphite having an average particle diameter ($D_{50}$) of 16 μm was subjected to plasma treatment under the following conditions to prepare a second negative electrode active material having a water contact angle of 8°.

The plasma treatment was carried out by using an inductively coupled plasma system forming high-density plasma under high vacuum. The input gas included $O_2$ and Ar gas and set to a flow rate of 40 sccm. The other processing conditions were as follows: source power of 50 W, pressure of 6 mTorr and treatment time of 30 minutes.

The first negative electrode active material and the second negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a negative electrode mixture layer. Herein, the first negative electrode active material and the second negative electrode active material were used at a weight ratio of 1:1. The slurry for a negative electrode mixture layer was agitated at 70 rpm for 30 minutes. As a result, the second negative electrode active material was separated as the upper layer of slurry and the first negative electrode active material was separated as the lower layer of slurry. Then, the interlayer separated slurry for a negative electrode mixture layer was applied onto a copper current collector and dried in a vacuum oven at 130° C., and then pressing was carried out to obtain a negative electrode having a bilayer structure.

In addition, Li metal was used as a counter electrode and a porous polyethylene separator was interposed between the negative electrode and Li metal to form an electrode assembly, and an electrolyte containing 0.5 wt % of vinylene carbonate and 1M $LiPF_6$ dissolved in a mixed solvent of ethyl methyl carbonate (EMC) with ethylene carbonate (EC) at a volume ratio of 7:3 was injected thereto, thereby providing a lithium coin half-cell.

Example 5

Natural graphite having an average particle diameter ($D_{50}$) of 11 μm was subjected to vapor phase deposition with perfluorodecyl trichlorosilane (FDTS) under vacuum at 100° C. for 30 minutes to prepare a first negative electrode active material having a water contact angle of 144°.

Natural graphite having an average particle diameter ($D_{50}$) of 16 μm was subjected to plasma treatment under the following conditions to prepare a second negative electrode active material having a water contact angle of 12°.

The plasma treatment was carried out by using an inductively coupled plasma system forming high-density plasma under high vacuum. The input gas included $O_2$ and Ar gas and set to a flow rate of 40 sccm. The other processing conditions were as follows: source power of 50 W, pressure of 6 mTorr and treatment time of 30 seconds.

Natural graphite having an average particle diameter ($D_{50}$) of 16 μm was subjected to plasma treatment under the following conditions to prepare a third negative electrode active material having a water contact angle of 8°.

The plasma treatment was carried out by using an inductively coupled plasma system forming high-density plasma under high vacuum. The input gas included $O_2$ and Ar gas and set to a flow rate of 40 sccm. The other processing conditions were as follows: source power of 50 W, pressure of 6 mTorr and treatment time of 30 minutes.

The first negative electrode active material, the second negative electrode active material and the third negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a negative electrode mixture layer. Herein, the first negative electrode active material, the second negative electrode active material and the third negative electrode active material were used at a weight ratio of 1:1:1. The slurry for a negative electrode mixture layer was agitated at 70 rpm for 30 minutes. As a result, the third negative electrode active material was separated as the upper layer of slurry, the second negative electrode active material was separated as mid-layer of slurry, and the first negative electrode active material was separated as the lower layer of slurry. Then, the interlayer separated slurry for a negative electrode mixture layer was applied onto a copper current collector and dried in a vacuum oven at 130° C., and then pressing was carried out to obtain a negative electrode having a trilayer structure.

In addition, Li metal was used as a counter electrode and a porous polyethylene separator was interposed between the negative electrode and Li metal to form an electrode assembly, and an electrolyte containing 0.5 wt % of vinylene carbonate and 1M LiPF$_6$ dissolved in a mixed solvent of ethyl methyl carbonate (EMC) with ethylene carbonate (EC) at a volume ratio of 7:3 was injected thereto, thereby providing a lithium coin half-cell.

COMPARATIVE EXAMPLE 1

Non-surface treated natural graphite (water contact angle of 70°) having an average particle diameter (D$_{50}$) of 11 µm was used as a first negative electrode active material. Non-surface treated natural graphite (water contact angle of 70°) having an average particle diameter (D$_{50}$) of 16 µm was used as a second negative electrode active material.

The first negative electrode active material and the second negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a negative electrode mixture layer. Then, the slurry for a negative electrode mixture layer was applied onto a copper current collector and dried in a vacuum oven at 130° C., and then pressing was carried out to obtain a negative electrode having a monolayer structure.

In addition, Li metal was used as a counter electrode and a porous polyethylene separator was interposed between the negative electrode and Li metal to form an electrode assembly, and an electrolyte containing 0.5 wt % of vinylene carbonate and 1M LiPF$_6$ dissolved in a mixed solvent of ethyl methyl carbonate (EMC) with ethylene carbonate (EC) at a volume ratio of 7:3 was injected thereto, thereby providing a lithium coin half-cell.

COMPARATIVE EXAMPLE 2

Non-surface treated natural graphite (water contact angle of 70°) having an average particle diameter (D$_{50}$) of 11 µm was used as a first negative electrode active material. Non-surface treated natural graphite (water contact angle of 70°) having an average particle diameter (D$_{50}$) of 16 µm was used as a second negative electrode active material.

The first negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a first negative electrode mixture layer. The second negative electrode active material prepared as described above, carbon black as a conductive material, and carboxymethyl cellulose (CMC) and styrene butadiene rubber (SBR) as binders were mixed with water as a dispersion medium at a weight ratio of 95.8:1:1.7:1.5 to provide slurry for a second negative electrode mixture layer.

Then, the slurry for a second negative electrode mixture layer was applied onto a copper current collector and dried in a vacuum oven at 130° C., and then pressing was carried out. After that, the slurry for a first negative electrode mixture layer was applied onto the second negative electrode mixture layer and dried in a vacuum oven at 130° C., and then pressing was carried out to obtain a negative electrode having a bilayer structure.

In addition, Li metal was used as a counter electrode and a porous polyethylene separator was interposed between the negative electrode and Li metal to form an electrode assembly, and an electrolyte containing 0.5 wt % of vinylene carbonate and 1M LiPF$_6$ dissolved in a mixed solvent of ethyl methyl carbonate (EMC) with ethylene carbonate (EC) at a volume ratio of 7:3 was injected thereto, thereby providing a lithium coin half-cell.

COMPARATIVE EXAMPLE 3

A negative electrode and a lithium coin half-cell were obtained in the same manner as Comparative Example 2, except that after the slurry for a first negative electrode mixture layer was applied to a copper current collector, dried in a vacuum oven at 130° C. and pressing was carried out, the slurry for a second negative electrode mixture layer was applied onto the first negative electrode mixture layer, dried in a vacuum oven at 130° C. and pressing was carried out to obtain a negative electrode having a bilayer structure.

Evaluation Results (1) Method for Evaluating Water Contact Angle

A negative electrode active material was formed into pellets having a density of 1.6 g/cc and the water (deionized water) contact angle was measured by using a contact angle measuring system (Surface Electroptics Co., SEO300A).

(2) Method for Evaluating Life Characteristics of Battery

Each of the lithium coin half-cells according to Examples 1-5 and Comparative Examples 1-3 was charged at room temperature (23° C.) with 0.5 C-rate (charging at 0.3 C in a constant current mode, charging at 4.2V in a constant voltage mode, 0.005 C cut off) and discharged at 0.5 C-rate (discharging at 0.3 C in a constant current mode, 3.0 V cut off) and the charge/discharge cycles were repeated 50 times to determine the capacity maintenance. The results are shown in the following Table 1.

(3) Method for Evaluating Adhesion (gf) of Negative Electrode

Each of the negative electrodes according to Examples 1-5 and Comparative Examples 1-3 was cut at an interval of 20 mm and fixed to slide glass. Then, a 180° peel test was carried out while peeling the current collector to determine the peel strength (adhesion). The test result is recorded as an average value after determining peel strength of at least 5 specimens. The results are shown in the following Table 1.

TABLE 1

| | Water contact angle ratio (water contact angle of the first negative electrode active material)/(water contact angle of the second negative electrode active material) | Water contact angle ratio (water contact angle of the second negative electrode active material)/(water contact angle of the third negative electrode active material) | Capacity maintenance (%) [(capacity after 50 cycles)/ (capacity of 1 cycle) × 100] | Adhesion of negative electrode (gf) |
|---|---|---|---|---|
| Ex. 1 | 14 | — | 91 | 38 |
| Ex. 2 | 7 | — | 91 | 35 |
| Ex. 3 | 2 | — | 91 | 27 |
| Ex. 4 | 18 | — | 91 | 39 |
| Ex. 5 (Trilayer structure) | 12 | 1.5 | 91 | 39 |
| Comp. Ex. 1 | 1 | — | 65 | 15 |
| Comp. Ex. 2 | 1 | — | 88 | 27 |
| Comp. Ex. 3 | 1 | — | 87 | 26 |

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A negative electrode for a lithium secondary battery which comprises:
    a negative electrode current collector;
    a first negative electrode mixture layer positioned on at least one surface of the negative electrode current collector and comprising a first negative electrode active material, a polymer binder and a conductive material; and
    a second negative electrode mixture layer positioned on a top surface of the first negative electrode mixture layer and comprising a second negative electrode active material, a polymer binder and a conductive material,
    wherein the second negative electrode active material has a smaller water contact angle as compared to the first negative electrode active material, and at least one of the first negative electrode active material and the second negative electrode active material is surface-modified, and
    wherein a ratio of the water contact angle of the first negative electrode active material to the water contact angle of the second negative electrode active material is 1.5-18.

2. The negative electrode for a lithium secondary battery according to claim 1, wherein the second negative electrode active material is surface-modified through hydrophilization, or the first negative electrode active material is surface-modified through hydrophobization; or the second negative electrode active material is surface-modified through hydrophilization and the first negative electrode active material is surface-modified through hydrophobization at the same time.

3. The negative electrode for a lithium secondary battery according to claim 1, wherein a ratio of the water contact angle of the first negative electrode active material to the water contact angle of the second negative electrode active material is 7-18.

4. The negative electrode for a lithium secondary battery according to claim 1, wherein the water contact angle of the first negative electrode active is 95°-150° and the water contact angle of the second negative electrode active material is 5°-60°.

5. The negative electrode for a lithium secondary battery according to claim 1, wherein the water contact angle of the first negative electrode active is 95°-150° and the water contact angle of the second negative electrode active material is 70°-90°.

6. The negative electrode for a lithium secondary battery according to claim 1, wherein the water contact angle of the first negative electrode active is 70°-90° and the water contact angle of the second negative electrode active material is 5°-60°.

7. The negative electrode for a lithium secondary battery according to claim 1, which further comprises: a third negative electrode mixture layer positioned on a top surface of the second negative electrode mixture layer and comprising a third negative electrode active material, a polymer binder and a conductive material,
    wherein the third negative electrode active material has a smaller water contact angle as compared to the first negative elective active material and the second negative electrode active material.

8. A lithium secondary battery comprising a positive electrode, a negative electrode and a separator interposed between the positive electrode and the negative electrode, wherein the negative electrode is defined according to claim 1.

9. A method for manufacturing a negative electrode for a lithium secondary battery, comprising:
    preparing a slurry for a negative electrode mixture layer comprising a first negative electrode active material, a second negative electrode active material, a polymer binder, a conductive material and a dispersion medium, wherein the second negative electrode active material has a smaller water contact angle as compared to the first negative electrode active material, and at least one of the first negative electrode active material and the second negative electrode active material is surface-modified;
    allowing the second negative electrode active material in the slurry for a negative electrode mixture layer to move toward an upper surface of the slurry as compared to the first negative electrode active material, thereby causing interlayer separation between the second negative electrode active material and the first negative electrode active material; and
    applying the interlayer separated slurry for the negative electrode mixture layer to at least one surface of a negative electrode current collector, followed by drying, to form a first negative electrode mixture layer comprising the first negative electrode active material, polymer binder and the conductive material; and a second negative electrode mixture layer positioned on a top surface of the first negative electrode mixture layer and comprising the second negative electrode active material, polymer binder and the conductive material.

10. The method for manufacturing a negative electrode for a lithium secondary battery according to claim 9,
wherein when a third negative electrode active material having a smaller water contact angle as compared to the first negative electrode active material and the second negative electrode active material is further incorporated to the slurry for a negative electrode mixture layer during the preparing the slurry for a negative electrode mixture layer,
allowing the third negative electrode active material in the slurry for the negative electrode mixture layer to move toward the upper surface of the slurry as compared to the second negative electrode active material and the first negative electrode active material to cause interlayer separation of the third negative electrode active material, the second negative electrode active material and the first negative electrode active material, successively, and
applying the interlayer separated slurry for a negative electrode mixture layer to at least one surface of a negative electrode current collector, followed by drying, to form the first negative electrode mixture layer comprising the first negative electrode active material, polymer binder and the conductive material; the second negative electrode mixture layer positioned on the top surface of the first negative electrode mixture layer and comprising the second negative electrode active material, polymer binder and the conductive material, and a third negative electrode mixture layer positioned on a top surface of the second negative electrode mixture layer and comprising the third negative electrode active material, polymer binder and the conductive material.

\* \* \* \* \*